Jan 6, 1931. J. C. LEDBETTER 1,787,669
CABLE CONNECTER
Filed June 2, 1928
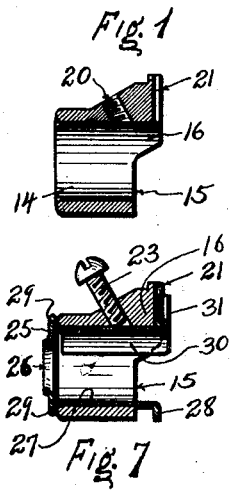
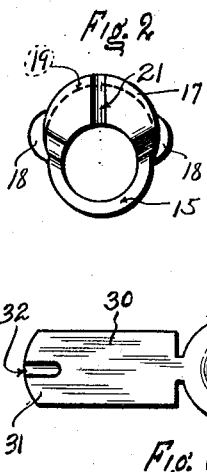
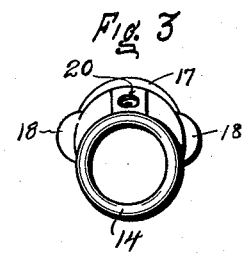
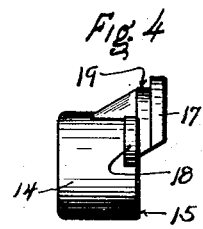
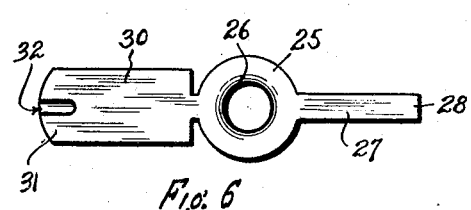
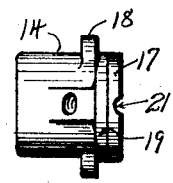
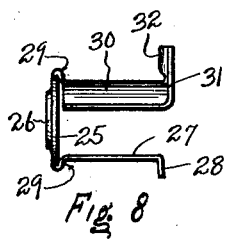
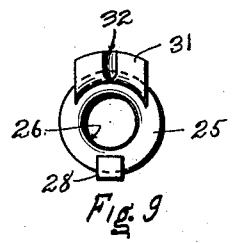
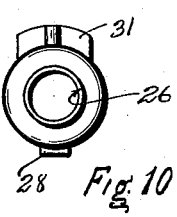
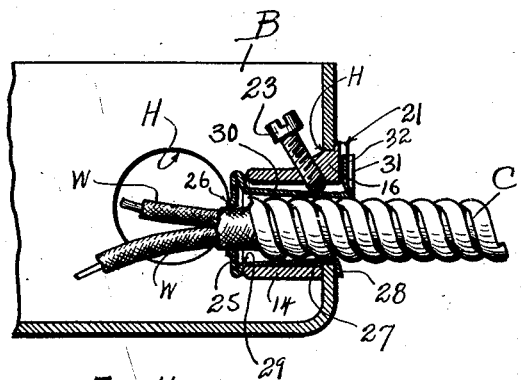
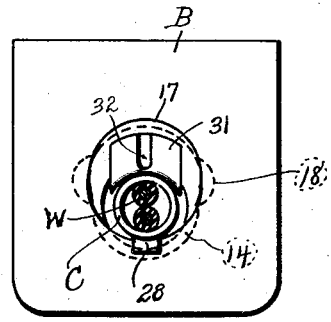
INVENTOR.
James Camrod Ledbetter
BY
Bohleber & Ledbetter
ATTORNEYS Patented Jan. 6, 1931

1,787,669

UNITED STATES PATENT OFFICE

JAMES CAMROD LEDBETTER, OF NEW YORK, N. Y., ASSIGNOR TO THE THOMAS & BETTS CO., OF ELIZABETH, NEW JERSEY, A CORPORATION OF NEW JERSEY

CABLE CONNECTER

Application filed June 2, 1928. Serial No. 282,472.

This invention relates to cable connecters for use in connection with electric house wiring installation and the like to anchor cable to electrical outlet boxes.

A main object of this invention is to produce improvements in cable connecters of the type or kind which expose a portion of the box hole edge to the cable received thereinto. In particular my improvements relate to a novel one-piece bushing insert carried by or within a connecter member, the insert including a bushing, a cable clamp plate attached thereto, and a connecter-support arm or retaining hook to support the weight of the connecter in the box hole and retain it therein preliminary to the insertion of the cable and the tightening of the operating means. Likewise the one-piece insert may also include an adapting shutter which closes that part of the connecter sleeve or box hole not occupied by the cable and hence my connecter is useful for large and small cable alike.

A further object of the invention is to produce a simple connecter featuring the one-piece bushing made with a cable-clamp plate, a shutter and retaining hook all of which are fashioned from a single-sheet stamping and which single part is carried with a connecter member and in case the latter is made in sleeve form as shown for example in the present disclosure, it follows that the composite bushing, adapting shutter, clamp plate and retaining-arm hook are mounted within the sleeve.

Having the above and other objects in view, reference is now made to the accompanying drawings showing an example of the invention wherein:

Figures 1 through 5, respectively, show a longitudinal section; and shows an outer end, an inner end, and a side elevation; and shows a top plan view of a connecter member made in this instance as a sleeve. It is to be understood, however, that the shape and form of this connecter member may be varied without departing from the principles of this invention, since indeed the invention itself relates to the novel one-piece composite-bushing insert carried with or by the member.

Figure 6 shows a flat one-piece sheet-metal stamping from which is fashioned the improved composite bushing including a cable clamp plate, an adapting shutter and connecter-support hook.

Figure 7 shows a longitudinal section of the completely assembled connecter with screw-operating means and with the bushing insert mounted in place on the connecter member.

Figures 8, 9 and 10 show, respectively, a side, an outer end and inner end elevation of the completed and integral one-piece bushing insert which includes a wire bushing, a clamp plate, a shutter and a connecter-support hook.

Figure 11 shows a longitudinal section of a completed box assembly with a cable and a connecter anchored in the box knockout or cable receiving hole; and Figure 12 shows an outside end elevation of the box assembly.

In electrical house wiring installations, outlet boxes B of any suitable type are provided with knockout openings or holes H into which are received conduit or cable C containing the electrical wires W which are connected to other wires (not shown) in the box to supply current to lighting fixtures or other devices. This invention provides a simple connecter to fix the cable in the box hole, the connecter being improved in respect to a single one-piece insert which includes a bushing through which the wires W pass and against which stops the inner ragged end of the cable C, and the bushing carries a connecter-support arm or hook which projects over and bears on the box hole edge to securely hold the connecter in place within the box hole until the mechanic succeeds in placing the cable C in place and until he tightens the operating screw.

Describing first the structure of one suitable form of connecter member, I will say that the member 14 is in effect the frame or body on which all movable parts are mounted. It is usually made in sleeve form, and is suitable in size to fit into the box hole and is so shaped and formed as to leave exposed or uncovered a portion of said box hole edge H. To this end the short side of the connecter sleeve 14 has a portion cut away as indicated at 15 which makes the lower half 14 of the sleeve short and the upper half 16 thereof is long. The result is that the upper long or projecting sleeve portion 16 extends through and overhangs one portion of the box hole edge and thereby conceals that portion of the box hole edge H while the shortened cutaway sleeve portion 15 leaves exposed a part of the box hole edge.

The upper longer sleeve portion 16 is provided with any suitable box hole edge anchorage means in the form of ears 17 on the outside of the box and ears 18 on the inside of the box. Hence a box hole wall or box edge receiving groove or shouldered recess 19 is in reality defined between the ears or ribs 17 and 18. When the box hole edge or box wall rests in the groove 19, it follows that the connecter member 14—16 is fixed or anchored in the box against longitudinal displacement. For short the structural means 17—18—19 is simply referred to as anchorage means because it anchors the connecter in the box. A threaded screw hole 20 is made through the upper longer portion of the connecter member and points toward the cutaway sleeve portion 15, i. e., the screw hole 20 and hence a screw points toward the exposed box hole edge portion. A radial groove 21 may be formed in the longer portion 16 of the sleeve above the cutaway portion 15 and this groove may be formed in or through the outer ear or rib 17 and acts to guide an adapting shutter in up and down motion to and from the cable as later described.

Operating means such as a screw 23 is threaded into the tapped hole 20 through the connecter member and toward the shortened cutaway member portion 15. This arrangement of the screw directs one end thereof towards the exposed portion of the box hole edge and hence delivers the screw pressure to the most effective place as will be explained. The foregoing description covers in general one form of connecter member with operating means mounted therein. A description will now be given of the combination one-piece bushing insert which more particularly constitutes my invention.

Figure 6 shows a flat sheet-metal stamping from which is made the composite-bushing insert adapted to be mounted in the cable connecter sleeve or carried by any connecter member of the type which exposes a part of the box hole edge. The stamping includes a central ring 25 which is fashioned into a bushing and cable stop with a central wire bushing 26 and passage flared and ovalled for smoothness to protect the wires W. The bushing 26 carries an integral spring-hook arm 27 the outer end 28 of which may be bent outwardly to form a box-hole hook 28. The spring arm 27 is pressed inwardly at 29 and at right angles to the plane of the ring 25 so that the spring retaining arm 27 is set inwardly from the rim or periphery of the ring 25 as indicated at 29.

The ring 25 also carries another arm 30 adapted for use as a cable clamp plate. The two arms 27 and 30 are preferably disposed diametrically opposite each other and are integral with the bushing ring 25. The inner end of the cable clamp 30 is also swedged inwardly at 29. The outer end 31 of the cable clamp plate 30 is bent outwardly to form an adapting shutter 31. The shutter end 31 is made with a rib 32 pressed therein. This rib 32 slidably engages the groove 21 formed in the upper outer end of the connecter member to restrain the sheet-metal insert from rotating out of normal operating position within the sleeve.

The arms 27 and 30 are disposed normally parallel to each other and both outer ends 28 and 31 are bent away from each other to respectively form the outer box-hole hook 28 and the shutter 31. Likewise both arms 27 and 30 are disposed substantially perpendicular to the plane of the ring 25. These two arms 27 and 30 are offset, swedged or pressed inwardly as at 29 from the outer circumference of the ring 25 so that the spaced distance between the parallel arms 27 and 30 is actually somewhat less than the diameter of the ring 25. Hence the periphery of the ring 25 extends above or beyond the outer surface of the arms 27 and 30.

The construction of the connecter member 14 as well as the composite-bushing insert 25 has now been described. An explanation will now follow as to their assembly to show their working relation and the advantage of making the parts 30, 25 and 27 of the insert in one piece.

The composite sheet-metal spring insert 25 has its outer free hook ends 28 and 31 sprung together and towards each other, whereupon the sleeve 14 may be snapped into position as shown in Figure 7 by placing the arms 27 and 30 through the sleeve. The outside diameter of the bushing 25 being approximately equal to the diameter of the sleeve 14 and the swedged and offset portions 29 cause these two parts to match and fit well together so that the bushing-ring fits the sleeve end. In fact the offsets 29 for each arm 27 and 30 permits the bushing 25 to fully close the inner end of the sleeve. The cable-clamp plate 27—30 is placed under the screw 23 with the shutter-guide rib 32 slidably confined in the groove 21 of the connecter member. The longer sleeve portion 16 fills the space between the bushing 25 and shutter 31 and hence there is no appreciable longitudinal motion of the member 14 in the relation to or on the insert. The outer-hook end 28 of the retaining-spring arm 27 is spaced from the cutaway edge 15 a distance about equal to the thickness of the box wall. In other words the box hole edge is received within the space defined by the spring hook 28 and the cutaway edge 15 of the sleeve.

Figures 11 and 12 show the use of the connecter. It is snapped into box knockout H and it is significant that the spring-retaining arm 27 prevents the weight of the connecter from falling out of the box preliminary to the insertion of the cable C. The connecter would otherwise fall out and would necessarily have to be held by one hand of the mechanic while he inserted the cable C and tightened up the screw 23 if it were not for the effectiveness of the connecter-retaining arm 27. The connecter would drop out of its own weight because of the cutaway sleeve portion 15 which exposes substantially the lower half portion of the box hole edge. In the kind of connecter member used, it is desirable that a portion of the box hole edge be not covered by the member so that the outer surface of the cable will rest directly against the exposed box hole edge. Indeed the box hole edge H constitutes one jaw and the cable-clamp plate 30 constitutes the other jaw of a cable clamp of great strength. Since the box hole edge acts as one jaw, it follows that the cable is actually fastened to the box and this is an advantage because a firmer anchorage is established, much more so than by totally fixing the cable in the connecter and thereafter anchoring the connecter in a box.

Since the cutaway sleeve end edge portion 15 exposes a portion of the box hole edge it follows that the connecter when inserted in the box hole has no means of support and hence it would drop out. But I have provided against this contingency by supplying the improvements in the spring-snap hook 28 which supports the weight of the connecter and it cannot therefore fall out of the box not even by quickly pushing the cable C into the connecter. When the cable C is jammed into the connecter the hook 28 positively holds the member 14 in the box hole against displacement, the inner ragged end of the cable stops against the bushing and the wires W pass through the aperture 26 thereof. The screw 23 is now run down against the cable-clamp plate 30 and grips the cable C between the exposed box hole edge and cable clamp. The reaction force exerted on the connecter positively seats the box anchorage groove 19 against the upper box hole edge with the result that the ears 17 and 18 overlap the inside and outside of the box wall thereby positively anchored the connecter in the box. In other words, the operation of the screw clamps the cable in the box and simultaneously renders effective the box hole anchorage means carried on the connecter.

In case it is desired to fasten relatively small cable in the box, the screw 23 runs the cable-clamp plate 30 down until the latter clamps against the small size cable. If the cable is rather small in size, the shutter 31 closes the outer end of the connecter thereby avoiding the disadvantages of having unnecessary open spaces leading from the connecter sleeve into the box. The adapting shutter makes the connecter suitable for use with small size cable because the shutter closes the sleeve above the small cable.

It is significant in my invention that the composite-bushing insert 25 is made integral with its related parts. It is also a feature that the shutter 31 and offset 29 hold the insert in the connecter sleeve. A cable connecter of this kind does not require that the manufacturer make a bushing on the inner end of the connecter 14 and therefore the connecter member is simplified as to its manufacture. It may be remarked that the important feature with which this invention is concerned is the making of the bushing 25 and the hook arm 27—28 all in one part: and also the shutter 31, the cable-clamp plate 30, the bushing 25, the spring arm 27 and the hook 28 all in one integral part which reduces the number of parts in the final assembly.

A further feature of the invention is the fact that the bushing 25 and box hook 27—28 are advantageously made in one part aside from any consideration of the clamp plate 30 and shutter 31 because the latter two parts may be omitted. The fact that the arm 27 has its inner ends attached to the bushing 25 provides a long reach for the arm which is an advantage because it reaches inwardly to the inner end of the connecter sleeve and supports it against downwardly tipping displacement to restrain it from dropping out of the box hole.

In such modified forms of construction as I may choose to employ which does not make use of the cable clamp plate 30, the screw 23 will then alone function as a cable clamp and operating means. The screw end in this latter case bears directly against the cable and grips it between the stationary box edge and rotating screw end. The bushing and the box-hook connecter-support arm perform their functions quite independently of the bearing clamp plate.

The screw delivers pressure to the clamp plate and the latter distributes the pressure over one or more convolutions of the cable or over a greater area than the end of the screw end hence the cable is protected from crushing action by the screw. The clamp plate 30 also exerts pressure on the cable in the plane of the box wall and thus the cable is pinched against the exposed box hole edge. In fact the screw 23 is effectively tilted and located so that its inner end is approximately in the plane of the box wall.

It is evident that when the cable C is thrust into the connecter and against the bushing, that the shutter 31 and box-hole hook 28, either one or both of these parts, restrains the bushing 25 and firmly holds it against the end of the connecter sleeve. In the same way, the bushing holds the shutter 31 and hook 28 in proper position.

Any suitable means may be used to fix the sheet metal insert 30—25—27 against rotation within the connecter member 14 and since the expedient of the guide groove 21 with shutter rib 32 is known in the art for this purpose, the same is adopted as a matter of convenience. This cooperating guide means 21—32 interposed between the shutter and connecter member positively holds the clamp plate 30 under the screw.

The box-hook arm 27 may well afford to be narrow so as not to cover up too much of the exposed box hole edge portion. On the other hand the clamp plate 30 may if desired be wide and arched or curved in cross-section to fit the cable. These two outstanding arm parts may of course be modified in many respects. So far as I am aware, it is new to make the bushing insert 25 integral with its related parts shown and described. Assuredly, it is also new to integrally make the bushing 26 alone and itself in one piece with the connecter-support hook 27—28 by which an exposed-box-hole-edge-type of connecter is snapped into a box knockout and held there preliminary to completing the box assembly.

What is claimed is:

1. A cable connecter comprising a member suitable in size to fit into a box hole and being so shaped and formed as to leave exposed a portion of the box hole edge, a single sheet-metal stamping fashioned into a bushing which is disposed at one end of the member and including an integral spring-arm hook carried perpendicular to and with the bushing and which is adapted to engage said exposed box hole edge and support the connecter in the box hole preliminary to inserting a cable, box hole edge anchorage means carried on the connecter to fix it in a box hole, and cable clamp and operating means to grip a cable and render effective the anchorage means.

2. A cable connecter comprising a sleeve suitable in size to fit into a box hole and being cutaway and so shaped and formed as to leave exposed a portion of a box hole edge, anchorage means on the member to fix it in a box hole, a bushing-ring disposed at and closing the inner end of the sleeve, and a spring-hook connecter-supporting arm integral with and projecting from the bushing-ring and swedged inwardly from the periphery of the bushing-ring and extending through the sleeve and having on its free end a portion to engage and hold against a box hole edge, and said inwardly swedged portion of the bushing-ring affording an outer free and clear bushing-ring periphery whereby the inner end of the sleeve is fitted with and closed by the bushing-ring.

3. A connecter comprising a member suitable in size to fit into a box hole and being so shaped and formed that it leaves a portion of the box hole edge exposed to a cable when inserted; a bushing, a cable clamp plate and a retaining spring integrally formed from a single sheet of material; the bushing being disposed at one end of the member, the cable clamp plate and the retaining spring being spaced apart and normally parallel and projecting from the bushing and extending alongside the member thereby adapting a cable to be received therebetween; the retaining spring being adapted to bear on the exposed portion of a box hole edge and thereby support the weight of the connecter to prevent it from dropping out of the box hole preliminary to the insertion of a cable therein; and operating means carried by the connecter to force the cable clamp plate against a cable and hence grip the cable against the exposed box hole edge and by reaction cause the member to anchor itself in the box.

4. A connecter comprising a member suitable in size to fit into a box hole and being so shaped and formed that it leaves exposed a portion of the box hole edge; a bushing, a cable clamp plate, a shutter and a retaining spring all fashioned from a single sheet of material; the bushing being mounted stationary at one end of the member, and the shutter being slidably carried at the other end of the member, the clamp plate being placed alongside the member and adapted to flex toward the exposed box hole edge, and the retaining spring overlying and bearing on the exposed box hole edge to support the weight of and to retain the connecter in the box hole preliminary to the insertion of a cable through the box hole; and operating means carried with the connecter adapted to move the cable clamp plate against a cable and hence grip the latter against the exposed box hole edge and by reaction firmly seat the member against the box hole edge to anchor the connecter in the box and to also move the shutter toward the cable.

5. A connecter comprising a stamping which includes a ring with a pair of arms extending from diametrically opposite points; the ring being fashioned into a bushing, one arm being formed into a cable clamp plate, and the other arm being made into a retaining spring; a sleeve suitable in size to fit into a box hole and being so shaped and formed as to leave exposed a portion of the edge of said box hole; the ring-bushing mounted at one end of the sleeve and being larger than the sleeve, the two arms extending through the sleeve, and an outwardly turned portion formed on each free end of the arm which confines the sleeve on the arms; and an operating screw threaded through the sleeve and bearing on one arm to clamp it against a cable and hence forcing the cable against the exposed portion of a box hole edge.

6. A connecter comprising a single piece stamping fashioned into a bushing, a cable clamp plate and a box hole hook integral with the bushing at its outer edge and extending therefrom at diametrically opposite points, a connecter sleeve mounted on the cable clamp plate and box hole hook, the outer free ends of the cable clamp plate and box hole hook including outwardly turned ends which holds together the sleeve and stamping and which also retains the connecter in a box hole preliminary to placing a cable therein, and operating means to force the cable clamp plate against a cable and force the latter toward the box hole hook.

In testimony whereof I affix my signature.

JAMES CAMROD LEDBETTER.